United States Patent [19]

Metzler et al.

[11] Patent Number: 5,587,057

[45] Date of Patent: Dec. 24, 1996

[54] HIGHLY CONDUCTIVE LIQUID MEDIA ELECTROCOAGULATION

[75] Inventors: David M. A. Metzler, 1001 Winchester, Kansas City, Mo. 64126; Albert L. Mauk, Kansas City, Kans.

[73] Assignee: David M. A. Metzler, Kansas City, Mo.

[21] Appl. No.: 163,683

[22] Filed: Dec. 7, 1993

Related U.S. Application Data

[63] Continuation-in-part of Ser. No. 854,360, Mar. 19, 1992, Pat. No. 5,271,814.

[51] Int. Cl.⁶ ............................................. C25D 17/00
[52] U.S. Cl. .................. 204/228; 204/268; 204/269; 204/272; 205/742; 205/743
[58] Field of Search ........................... 204/228, 260, 204/268, 269, 272; 205/742, 743

[56] References Cited

U.S. PATENT DOCUMENTS

| | | | |
|---|---|---|---|
| 3,679,556 | 7/1972 | Doevenspeck | 204/269 |
| 3,862,022 | 1/1975 | Hermann | 204/272 |
| 3,873,438 | 3/1975 | Anderson et al. | 204/268 |
| 3,981,789 | 9/1976 | Harrison et al. | 204/272 |
| 4,098,673 | 7/1978 | Zucker | 204/648 |
| 4,123,339 | 10/1978 | Gale et al. | 205/744 |
| 4,123,340 | 10/1978 | Kammel et al. | 210/665 |
| 4,149,953 | 4/1979 | Rojo | 204/269 |
| 4,200,516 | 4/1980 | Pope | 204/671 |
| 4,285,805 | 8/1981 | Stegelman | 208/113 |
| 4,350,590 | 9/1982 | Robinson | 204/661 |
| 4,378,276 | 3/1983 | Liggett et al. | 204/149 |
| 4,525,272 | 6/1985 | Henson | 210/149 |
| 4,678,564 | 7/1987 | Moorehead et al. | 210/108 |
| 4,872,959 | 10/1989 | Herbst et al. | 205/566 |
| 4,908,109 | 3/1990 | Wright | 204/149 |
| 4,917,782 | 4/1990 | Davies | 205/743 |
| 4,988,427 | 1/1991 | Wright | 204/661 |

Primary Examiner—Arun S. Phasge
Assistant Examiner—William T. Leader
Attorney, Agent, or Firm—Litman, McMahon and Brown, L.L.C.

[57] ABSTRACT

Electrolytic treaters for treating highly conductive liquid media include a conductive housing structure which is fluidically sealed and has inlet and outlet fluid connections, a conductive electrode structure positioned within the housing structure, and a DC power supply connected to components of the housing and electrode structure in such a manner that the output voltage of the power supply is applied across a substantial portion of the liquid media to be treated to control the current flow from the power supply. In a preferred embodiment, the electrode structure is formed by a center electrode rod with a plurality of ring electrodes positioned coaxially between the center electrode rod and the housing. Each ring electrode is formed by a plurality of circumferentially spaced rod elements extending parallel to the center electrode. The rod elements in a given ring electrode are held in place by a plurality of annular spacer baffles which additionally affect the flow of liquid media through the treater.

9 Claims, 3 Drawing Sheets

Fig. 1.

HIGHLY CONDUCTIVE LIQUID MEDIA ELECTROCOAGULATION

CROSS REFERENCE TO RELATED APPLICATIONS

The present application is a continuation in part of Ser. No. 07/854,360 filed Mar. 19, 1992 on THIN FILM ELECTROCOAGULATION FOR REMOVAL OF CONTAMINANTS FROM LIQUID MEDIA, now U.S. Pat. No. 5,271,814 issued Dec. 21, 1993.

BACKGROUND OF THE INVENTION

In attempting to control environmental pollution from industries, human waste, and naturally decomposing minerals and chemicals, a wide variety of chemical and mechanical processes have been developed.

Chemical methods have attempted to cause a predetermined reaction between chemical additives and impurities contained within an aqueous solution. The most common reactions are designed to cause coalescences of the impurities and the chemical additives. As the coalescing occurs the materials flocculate and the particles which are then formed collect in layers, or "layer" according to their specific gravity within the aqueous solution. Many times, to effectively remove the chemically flocculated contaminants, additional chemicals are added to increase the size of the particles and, thus, the specific gravity of the particle. Increasing the size of the floc with additional chemical additives causes more rapid settling and better defined segregated layering within the solution. Air can be added to some solutions to cause a more rapid rise of the flocculated particles when the formed particles have a lighter specific gravity than the base solution. Combinations of chemicals and air can be used for complex aqueous solutions that have more than one contaminant.

Mechanical methods are designed to achieve similar results as chemical additives, but to a lesser degree of purity in the final aqueous solution. Filters, centrifuges, plate separators, and clarifiers are the most common mechanical methods employed to remove contaminants from aqueous solutions. In most cases the impurities that are removed mechanically are suspended solids or dissolved particles that are flocculated by changes in process temperature or retention time in the processed solution.

Over two decades ago, the chemical and mechanical methods of treating the aqueous solutions were thought to be adequate treatment prior to disposal. Disposal of the treated aqueous solution into the oceans, streams, lakes, and underground wells were common. Tests have shown that small amounts of impurities that escaped treatment from chemical or mechanical process or a combination of both processes have accumulated in soils, ground waters, lakes, and river beds. Many rivers and streams are now considered to be waste sites. Lakes have been drained and their lake beds have been hauled away to be treated as hazardous waste. Many times the chemical residue left from an original reaction which was used to remove a waste from industrial aqueous solutions became the residual waste and required additional chemicals and/or processing but did not receive additional processing, and the aqueous solution was unsafely discharged to the natural environment.

Causing the coalescence of contaminants without the addition of chemicals has been successfully performed by electrolytic treatment for several years. However, the previous electrolytic processes created large quantities of metal sludges and other contaminant sludges which added to the cost of disposal. Many current systems for performing electrolytic treatments are batch and dump methods which have a high labor cost, since each batch is individually sampled, treated, and separated prior to beginning the second batch.

On-line electrolytic systems, as opposed to batch systems, require large spaces for process retention time. Retention time is critical for the on-line system to obtain treatment standards. Retention time can be shortened with higher voltage and more electrical power consumption. On-line systems usually require a larger electrical supply, due in part to the retention time and the voltage required to electrically charge the pipe mass which is delivering the charge and transporting the liquid through the system. Capital costs are high and the cost for electrical power to operate the system is expensive. Since the required voltage and amperage across the poles is high the resulting flux is such that the piping deteriorates quickly, and maintenance for replacing the piping is frequent.

Other electrolytic devices have solved many of the problems of size, cost, and electrical power consumption in the prior art. However, none has accomplished the treatment of highly conductive waters such as sea water, acid quench waters, mineral waters with salts, and neutralized water high in sulfates. High concentrations of conductive contaminates have caused short circuiting of previous devices, such that only limited applications of treatments of such solutions have been accomplished. Those previous treatments were accomplished in some cases by dilution of the solutions with non-conductive materials. However, the resulting low efficiency has caused this practice to be discontinued due to the lack of economic feasibility.

Accordingly, there is a need for an efficient, low cost system which embodies the best of all previous systems, yet allows treatment of highly conductive solutions and remains flexible to treat a wide variety of other waste streams on-line, with minimal maintenance and energy cost.

SUMMARY OF THE INVENTION

The present invention provides configurations of treaters and processes using such treaters which are especially adapted for electrolytically treating liquid media having high conductivities. The present invention approaches the problem of electrolytically treating high conductivity liquids by configuring the treaters so that within the treaters, the liquid medium is divided into portions by sections of the electrodes. The output voltage of the power supply is applied across multiple portions of the liquid thereby dividing the total voltage across the multiple liquid portions whereby the resistance seen by the total voltage is the sum of the resistances of the multiple liquid portions connected in series. This "series resistance summation" or power supply voltage division results in a lower current draw from the power supply than if the liquid portions were connected in parallel. Thus, more economical power supplies can be employed. In addition, more effective electrolytic treatment occurs in some cases, since some contaminants are coagulated at the relatively lower current rates provided by the treaters of the present invention.

A preferred treater of the present invention is formed by an elongated, cylindrical conductive housing closed at opposite ends to form a cylindrical treater chamber and has respective fluid connections positioned near the opposite ends. A conductive center rod extends coaxially through the center of the chamber and is insulated from the housing. In the annular space between the center rod and the cylindrical wall of the housing, a plurality of concentric passive electrode rings, formed by circumferentially spaced passive electrode rods, extend the length of the treater chamber. In a preferred embodiment, the passive rods of each ring are positioned in parallel relation, are electrically interconnected, and are supported by baffle rings which additionally cause turbulence to liquid media flowing through the chamber. In the preferred treater, four passive electrode rings are employed; however, more or fewer passive electrode rings could be used, depending upon the application.

Opposite polarity terminals of a DC power supply are connected respectively to the housing and the center rod. The passive electrode rings "float" electrically, that is, they are not connected directly to the power supply terminals. With a conductive liquid in the treater chamber, the rings of electrode elements divide the volume of liquid into concentric portions. The voltage applied to the housing and center rod is divided radially across the concentric liquid portions whereby a higher resistance is presented to the voltage of the power supply than if the entire voltage were applied between a given electrode ring and the radially adjacent ring, center rod, or housing. The supporting baffle rings are positioned axially along the length of the chamber and cause turbulence in the liquid to promote mixing of treated and untreated portions of the liquid to thereby result in more complete treatment of the liquid as a whole.

The configuration of the preferred embodiment of the treater of the present invention can be adapted for treating liquids of relatively moderate conductivities by connecting the rings of rod electrodes differently from the preferred embodiment. In a modified embodiment of the treater, the housing is interconnected with the second and fourth electrode rings, radially inward from the housing. Similarly, the center rod is interconnected with the first and third electrode rings. The housing, along with the second and fourth electrode rings, is connected to one pole of the power supply, while the center rod, along with the first and third electrode rings, are connected to an opposite pole of the power supply from the housing. With the electrodes thus connected, electric fields of radially alternating polarity are provided to a liquid having a radial component of movement through the treater chamber. A radial component to the direction of liquid flow is provided by the baffle rings which support the rods of the electrode rings. The electrocoagulation of some contaminants is enhanced by travel through spatially alternating electric field polarities.

The preferred embodiment of the treaters of the present invention and the second or modified embodiment described above are suitable for electrolytically treating liquid media having relatively low viscosities. The present invention provides a third embodiment and a fourth embodiment which are especially configured for treating liquid media having relatively high viscosities. The third and fourth embodiments are each formed by an elongated cylindrical housing having an inner electrode structure positioned coaxially therein. The housing is closed at opposite ends to form a treater chamber. Fluid connections are provided near the opposite ends of the treater to provide for the entry and exit of liquid media. The inner electrode structure has a shape resembling an auger in some respects, formed by a center rod with helical flighting extending radially and along the center rod to define a closed helical shape. The closed helical shape is employed to promote turbulence in, and consequent mixing of, treated and untreated portions of the relatively viscous liquids flowing through the treater.

In the treaters of the third and fourth embodiments, the housing and inner electrode are each formed in axial sections wherein adjacent sections are electrically insulated from one another, and an electrode section is aligned with a respective housing section. The third and fourth embodiments are similar in physical characteristics. However, the electrical interconnection of the housing and electrode sections and the manner of connecting the power supply thereto differ between the embodiments. The third and fourth embodiments are intended for treating liquid media of relatively high viscosity and of relatively high conductivity. For this reason, the power supply of each embodiment is connected to the housing and electrode sections in such a manner as to divide the output voltage of the power supply across multiple sections of a liquid within the treater.

The housing and electrode sections of the third embodiment are interconnected in such a manner that the polarities of the electric fields between corresponding sets of housing and electrode sections do not spatially reverse from set to adjacent set. This is accomplished by connecting a first power supply terminal to a first endmost housing section, connecting the corresponding first endmost electrode section to the adjacent or second housing section, connecting the second electrode section the third housing section, and so forth. This staggered pattern of connections is continued to the opposite end of the treater, with the opposite endmost, or last, electrode section being connected to the opposite power supply terminal from the one connected to the first housing section. The resistance presented to the power supply with the above described connection configuration is higher than if a solid, electrically continuous center electrode were provided within a solid housing, thus providing a lower current draw to the power supply.

The housing and electrode sections of the fourth embodiment are interconnected in such a manner that the polarities of the electric fields between corresponding sets of a housing section and electrode section spatially reverse from one set to the next adjacent set. Starting at one end, a first power supply terminal is connected to one of the first sections, such as the first center electrode section. The corresponding or first housing section is connected to the second or adjacent housing section. The second electrode section is connected to the third electrode section, and the third housing section is connected to the fourth housing section. The interconnection pattern continues to the opposite end of the treater. The last housing or electrode section which is not connected to an adjacent section is then connected to the second power supply terminal of opposite polarity from the first power supply terminal.

The electrocoagulation treaters of the present invention are employed in treatment systems which include instrumentation for monitoring pressure and temperature differentials across the treater and current draw from the power supply. In general, pressure differential is monitored to detect clogging of the treater. The treater is fluidically connected to inlet and outlet conduits in such a manner that if the treater becomes clogged, the direction of flow through the treater can be reversed, without changing the flow direction through the inlet and outlet conduits to relieve the clog. Temperature rise in liquid exiting the treater is a measure of the electrical efficiency of the process. An excessive temperature rise indicates an excess of current. In general, an excessive temperature rise causes the treatment current to be reduced. However, a large temperature rise is desirable in some cases, such as where biological contaminants are present in the media. The overall electrical polarity can be periodically reversed for treatment of media in which electrocoagulation is enhanced by such polarity reversal. Alternatively, it might be desirable to reverse the polarity when flow direction is reversed.

OBJECTS AND ADVANTAGES OF THE INVENTION

The principal objects of the present invention are: to provide an improved electrocoagulation system for coalescing contaminants in liquid media to facilitate subsequent mechanical separation of the contaminants; to provide such a system which is particularly adapted for the electrolytic treatment of highly conductive liquid media; to provide such a system which avoids inadequacies of prior treatment systems; to provide such a system having the capability of monitoring the pressure differential across the treater apparatus and the ability to conveniently reverse the flow direction through the treater to unclog the treater; to provide such a system with the capability of monitoring temperature rise in solutions being treated and for automatically adjusting current flow between the DC power supply poles to control the temperature rise; to provide such a system having the capability of maintaining a high temperature rise in selected solutions to destroy biological contaminants therein; to provide such a system in which the treater and the process in general are scalable to accommodate a wide range of solution volume rates; to provide such a system which is suitable for treating a great variety of solutions of contaminants; to provide treater apparatus for treating high conductivity liquid media in which the output voltage of a power supply connected thereto is divided across multiple sections of the liquid in the treater whereby the resistances of the sections of liquid are summed in series to control the current flow from the power supply; to provide treater apparatus for electrolytically treating high conductivity liquid media of both low viscosities and moderate viscosities, such as oils, suspensions of oils and fats, suspensions of sludges, and the like; to provide such a treater apparatus including internal means for causing turbulence in liquid media flowing therethrough to promote more complete treatment of such media; to provide a treater apparatus for low viscosity liquid media which is formed of an elongated cylindrical housing forming an outer electrode, a center rod forming an inner electrode, and concentric rings of axially extending and circumferentially spaced conductive rod elements, the rods in each ring electrode being interconnected; to provide such a treater apparatus wherein the ring electrodes are not connected directly to the power supply terminals but are connected indirectly through the conductive liquid within the treater to the housing and center electrode whereby the ring electrodes define sections of liquid with the resistances of the sections placed in series across the power supply voltage to thereby divide the power supply voltage; to provide a modified embodiment of such a treater apparatus for liquid media of moderate conductivities in which the ring electrodes are connected in alternation to the housing and center electrodes to provide electric fields of spatially alternating polarity; to provide such treater apparatus having rings of axially extending rods wherein the rods are held in position by annular baffle members which are positioned to cause turbulence within the flowing liquid media; to provide embodiments of such an electrolytic treater for high conductivity media which are particularly adapted for treating liquid media of moderate viscosities; to provide such treater apparatus including an elongated cylindrical housing forming an outer electrode and an inner electrode having a shape resembling an auger formed by a center rod with flighting extending helically about and along the center rod; to provide such a moderate viscosity treater apparatus in which the housing and center electrode are formed in axial sections which are mutually insulated and wherein corresponding sections of the housing and center electrode are axially aligned; to provide an embodiment of such a moderate viscosity treater wherein the housing and electrode sections are mutually interconnected and connected to a power supply in such a manner as to provide electric fields between corresponding sets of a housing section and a center electrode section which do not spatially reverse from one treater section to the next; to provide another embodiment of such a moderate viscosity treater wherein the housing and electrode sections are mutually interconnected and connected to a power supply in such a manner as to provide electric fields between corresponding sets of a housing section and a center electrode section which spatially reverse from one treater section to the next; and to provide such treater apparatus and electrolytic treatment systems particularly for high conductivity liquid media which are economical to manufacture and maintain, which are effective and efficient in operation, and which are particularly well adapted for their intended purpose.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates an electrolytic coagulation or electrocoagulation apparatus which embodies the present invention. The apparatus 1 is in an electrocoagulation treatment process or system 2 illustrated in FIG. 1 for the flocculation of contaminants in liquid media and the removal of the flocculated contaminants from the liquid media. In general, the treater apparatus or treater 1 receives a solution having the contaminants therein from a supply conduit 3 and discharges the solution through discharge conduits 4 and 5 to a separator tank 6 wherein mechanical separation of the contaminants is facilitated by coalescence of the contaminants. The coalesced contaminants, depending on the specific gravity of the particular contaminants, may be separated by settling or by flotation in the separator tank 6. The clarified effluent is drawn from the separator tank or separator 6 into a collector tank 7 and, if sufficiently purified, may be recycled or sent to an outflow such as a stream or river or, if necessary, is sent to another process (not shown) for further treatment. The removed contaminants, depending on their nature, may also be recycled. The treater apparatus 1 of the present invention is particularly adapted for treating liquid media having a high electrical conductivity.

Figure 1:
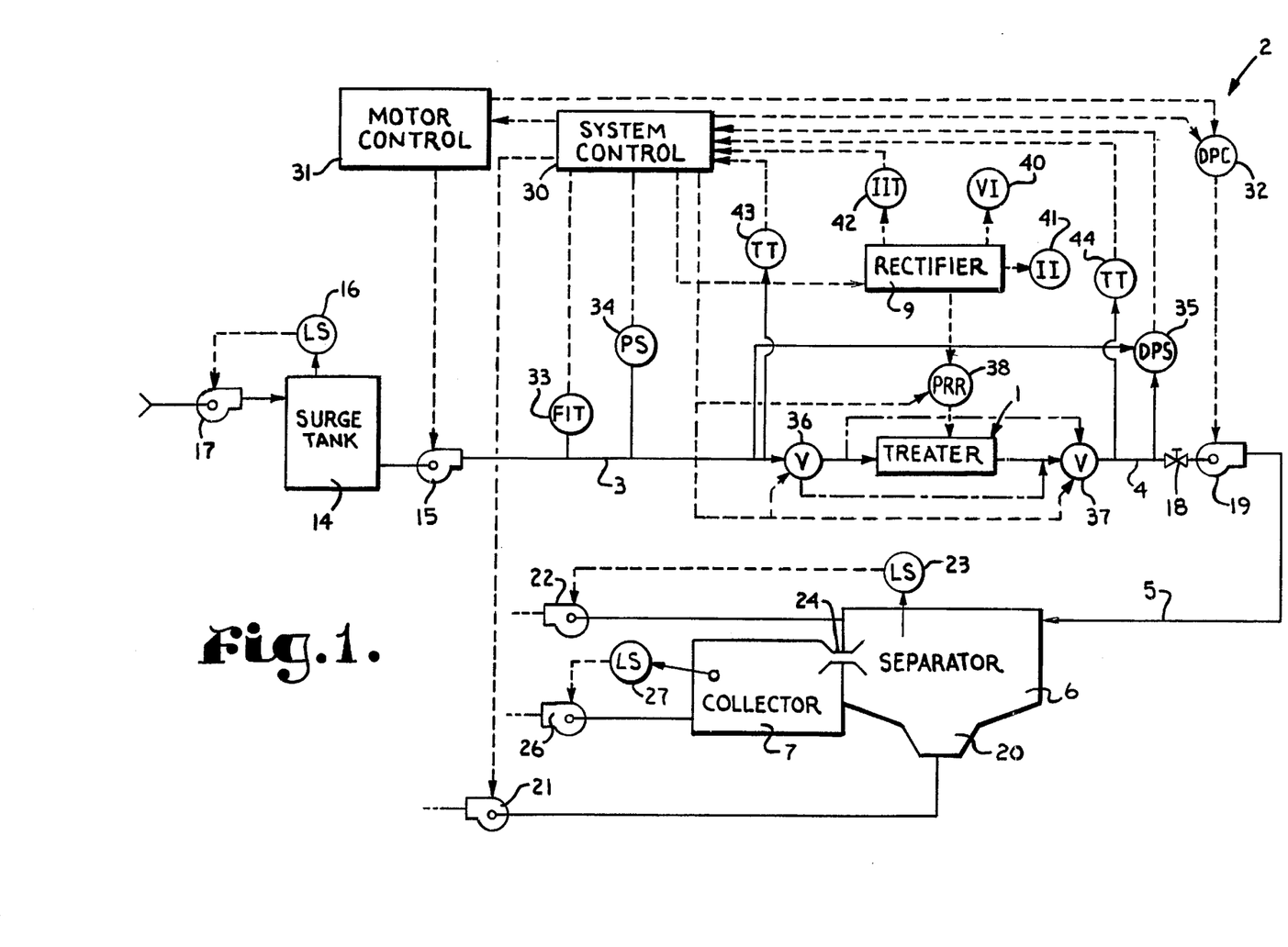
FIG. 1 is a block diagram of a process employing an apparatus for highly conductive liquid media electrocoagulation for removal of contaminants from liquid media which embodies the present invention.

A major problem in the electrolytic treatment of highly conductive liquid media is the tendency of the media to draw high levels of current, or even short circuit, the power supply or rectifier 9 of the process 2. In addition to the possible occurrence of damage to the power supply 9 and accelerated deterioration or consumption of the electrodes within the treater 1 from relatively high current levels, it is important to control the level of current flow through the treater 1 because some contaminants are coagulated more effectively at relatively lower levels of current flow. In the treater 1 of the present invention, the level of current draw is controlled to some extent by the use of multiple section electrodes which, with media to be treated in the treater 1, divide the output voltage of the power supply 9 across multiple resistance sections formed by corresponding electrode sections and portions of the liquid media to thereby lower the current draw from the power supply 9.

Referring to FIG. 1, the supply conduit 3 receives liquid to be treated from a surge tank 14 through a supply pump 15. The level within the surge tank 14 is controlled by a level switch 16 controlling a fill pump 17 which receives the liquid from an external source, such as another industrial process (not shown). On the discharge side of the treater 1, a pressure throttle 18 in the discharge conduit 4 cooperates with the supply pump 15 and a discharge pump 19 to control the flow of the liquid through the treater 1. The discharge pump 19 feeds the separator 6 through the outer discharge conduit 5.

The separator 6 may be an inclined plate separator or clarifier which collects denser sludge to a lower trough 20 from which the sludge may be drawn off by a sludge pump 21 to a collection vessel for further processing, recycling, disposal, or the like. Lighter floc may be skimmed off the top of the separator 6 by a skim pump 22 as controlled by a level switch 23. In a liquid in which the coalesced contaminants settle out, the clarified effluent is at the top of the separator tank 6. Conversely, if the coalesced contaminants float, the effluent is below the floc. In situation where some contaminants settle while others float, the effluent is between the contaminant levels. A collector tap 24 is positioned to flow the clarified effluent into the collector tank 7 where it may be pumped by a collector pump 26, as controlled by a level switch 27, to a site of disposal such as a waterway if permitted or to a process for further treatment if necessary, or the effluent may be recycled to an industrial process from which it was received.

The process 2 is monitored and controlled by a system controller 30 which may be in the nature of a conventional personal computer with appropriate software and interfaces or a dedicated type of computer, such as a programmable controller (PLC). The supply and discharge pumps 15 and 19 are controlled by way of a main motor control circuit 31, with finer adjustments to the operation of the discharge pump 19 provided by a discharge pump control (DPC) circuit 32. The system controller 30 receives inputs from the supply conduit 3 by way of a flow indicator transmitter (FIT) 33 and a pressure switch (PS) 34. A differential pressure switch (DPS) 35 is adjusted to sense a selected pressure differential between the supply conduit 3 and the discharge conduit 4 and sends a signal to the controller 30 upon the pressure differential exceeding the set point, thereby indicating clogging. This causes the controller 30 to change the state of a supply valve 36 and a discharge valve 37 to reverse flow direction through the treater 1. At the same time, a polarity reversing relay (PRR) 38 is controlled to change its state so that the polarities of the electrodes of the treater 1 are reversed.

The rectifier or DC power supply 9 is provided with a local voltage indicator (VI) 40 and a local current indicator (II) 41 as well as a current indicator transmitter (IIT) 42 which allows the controller 30 to monitor current flow through the treater 1. Temperature transmitters (TT) 43 and 44 monitor the temperature of liquid entering and exiting the treater 1. The controller 30 monitors the temperature rise of liquid passing through the treater 1 as one basis for controlling the current output of the rectifier 9 to thereby control the electrical efficiency of the process 2. In most cases, a current level which causes heating of the treated liquid beyond a selected amount is wasteful, and the current output of the rectifier 9 is lowered accordingly. On the other hand, if the process 2 is intended to destroy biological contaminants in the treated liquid, then the rectifier 9 is controlled to a maintain a desired temperature rise.

Figures 2, 3, 8:
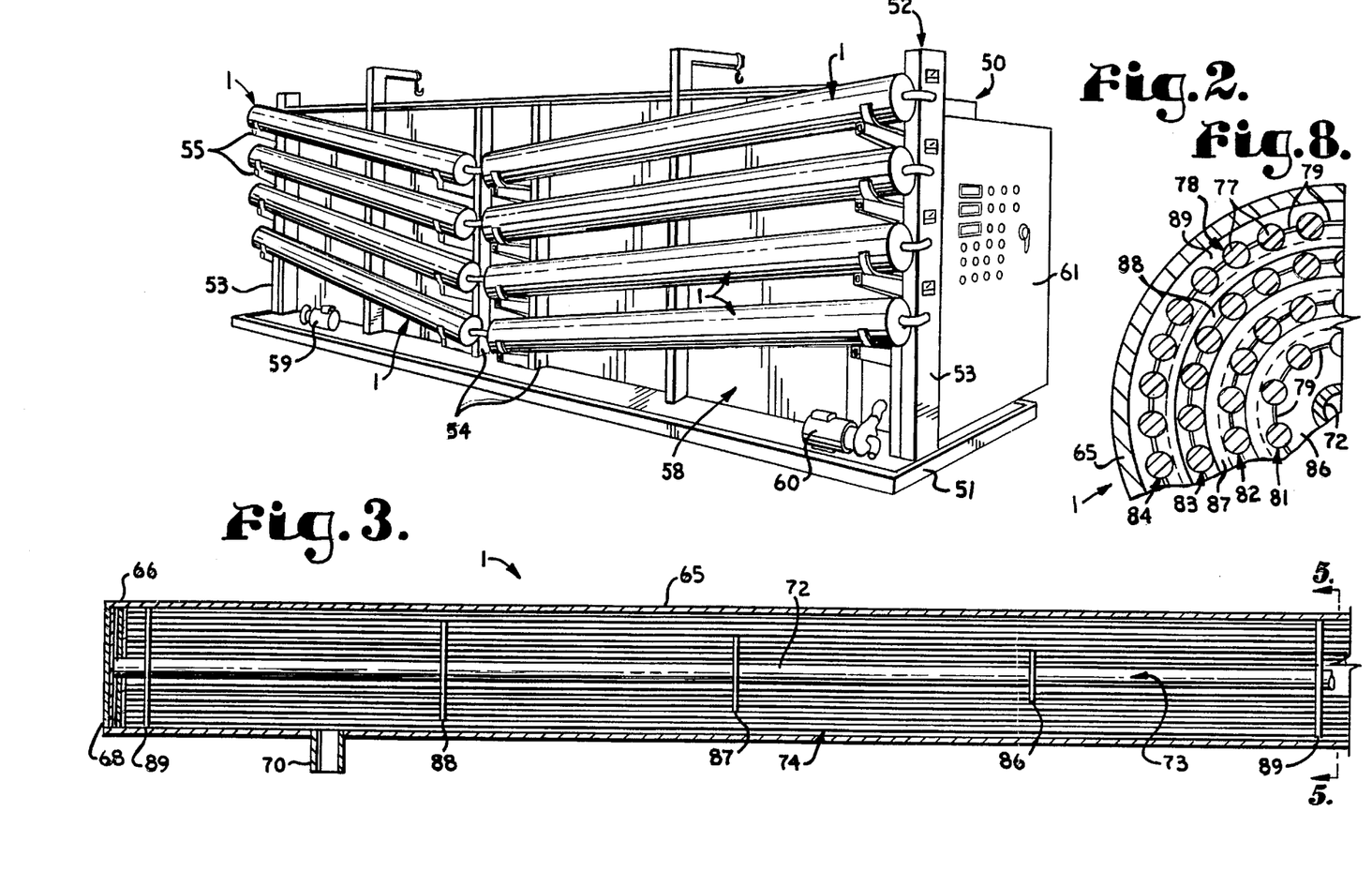
FIG. 2 is a perspective view of an embodiment of apparatus for practicing the process of FIG. 1 for highly conductive liquid media electrocoagulation.
FIG. 3 is a fragmentary diagrammatic longitudinal sectional view of an electrocoagulation treater for highly conductive media for use in the process of FIGS. 1 or 2.
FIG. 8 is a view similar to FIG. 5 and illustrates details of electrical interconnection of the rod elements of the ring electrodes.

FIG. 2 illustrates an exemplary embodiment of major portions of the electrolytic liquid media treatment process 2 shown in FIG. 1. The process assembly 50 includes a base 51 with a framework 52 extending upwardly therefrom. Corner standards 53 and medial standards 54 of the framework 52 have a plurality of outwardly extending arms 55 which support a plurality of treater apparatus or treaters 1. The treaters 1 may be fluidically connected in series, in parallel, or in various types of series-parallel arrangements according to the requirements of the process 2 and the character of the contaminants in the liquid media being treated. The framework 52 also supports a tank 58, such as the surge tank 14 of FIG. 1, which holds a quantity of the liquid to be treated. Pumps 59 and 60 (plumbing not shown) are provided on the base 51 and correspond respectively to the supply pump 15 and the discharge pump 19 of FIG. 1. Finally, the framework 52 supports a control housing 61 which houses the system controller 30, the rectifier or power supply 9, and other instrumentation of the process 2.

Figures 4, 5, 6, 7:
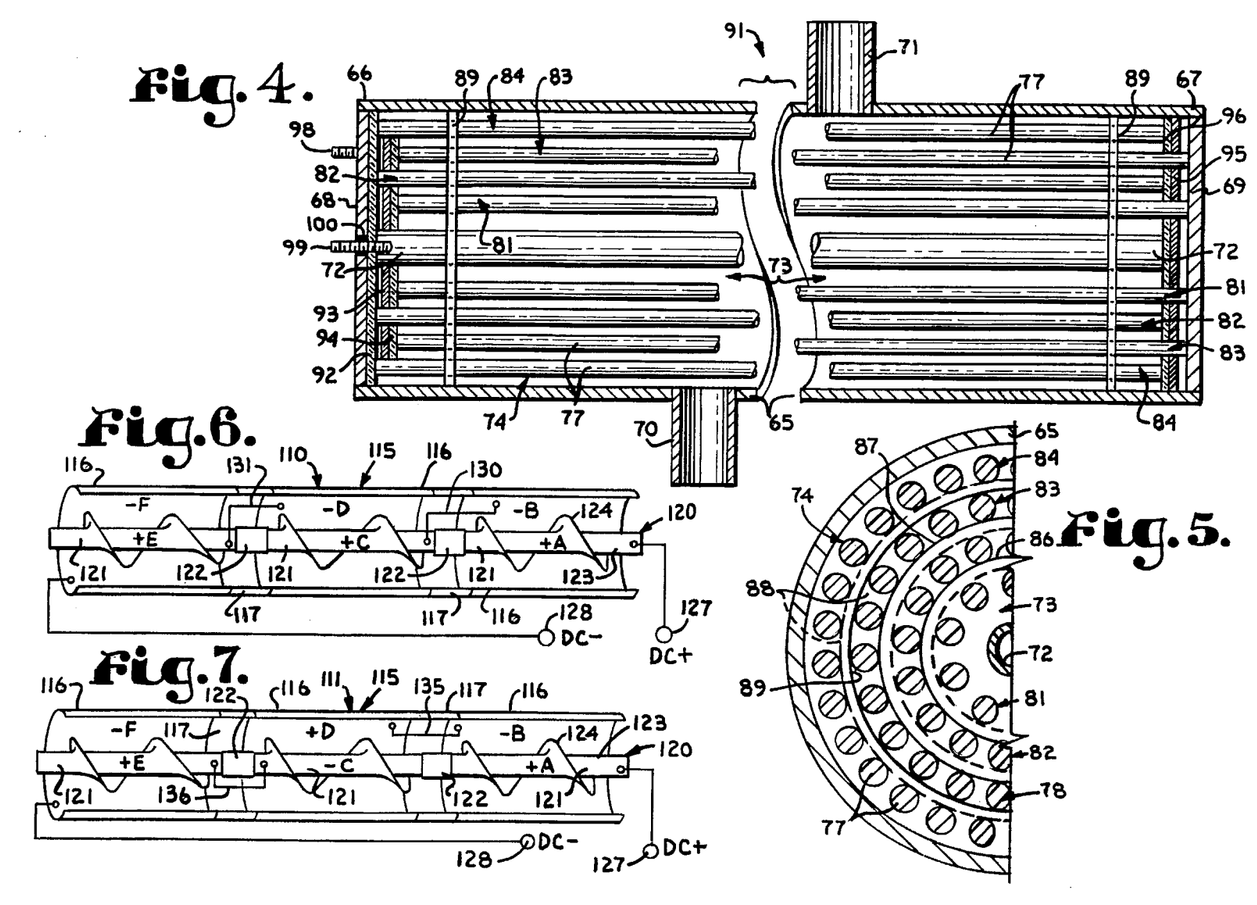
FIG. 4 is a greatly enlarged fragmentary diagrammatic longitudinal sectional view of the treater illustrated in FIG. 3 and showing components of the treater in greater detail.
FIG. 5 is a further enlarged half transverse sectional view taken on line 5—5 of FIG. 3 and illustrates details of electrode rod elements and spacer members of the treater.
FIG. 6 is a fragmentary diagrammatic longitudinal sectional view of a first modified embodiment of an electrocoagulation treater for highly conductive liquid media employing an auger shaped inner electrode structure.
FIG. 7 is a view similar to FIG. 6 and illustrates modified embodiment of the treater of FIG. 6 with an alternative electrical interconnection arrangement.

FIGS. 3–5 illustrate a preferred embodiment of the treater apparatus 1 of the present invention. The treater 1 generally includes an elongated cylindrical housing 65 which is closed at opposite ends 66 and 67 by respective end walls 68 and 69 (FIG. 4). The housing 65 has first and second fluid connections 70 and 71, either of which may function as an inlet connection or an outlet connection. A center electrode rod or tube 72 extends axially through the housing 65. The housing 65 and center rod 72 are formed of conductive materials. The materials from which the housing 65 and center rod 72 are constructed need not be the same. The elongated annular space between the center rod 72 and housing 65 comprises a treater or treatment chamber 73 and is occupied by an electrode structure 74, as will be detailed below.

The electrode structure 74 is formed by a plurality of axially extending electrode elements or rods 77 which extend parallel to the center rod 72. The rods 77 are preferably arranged in circumferentially spaced relation to form concentric rings which are positioned in coaxial relation with the center rod 72. The rods 77 within a given ring are interconnected electrically to define a ring electrode 78 (FIGS. 5 and 8), as by wires or conductive bars 79. Alternatively, other means may be employed to interconnect the rods 77 comprising the ring electrodes, such as conductive means (not shown) incorporated into the baffles 86–89. In the illustrated treater 1, there are four ring electrodes positioned coaxially: 81, 82, 83, and 84. The rods 77 of the ring electrodes 78 are held in place by respective annular baffles through which the rods 77 extend. At least two baffles are associated with each ring electrode 78. The rods 77 of the inner most ring electrode 81 are mounted in baffles 86. Similarly, the rods 77 of ring electrodes 82, 83, and 84 are mounted respectively in baffles 87, 88, and 89.

The annular baffles 86–89 are preferably formed of an insulating and chemically inert material, such as certain kinds of synthetic resins. The baffles 86–89 are sized so that their inner and outer edges engage the rods 77 of radially adjacent ring electrodes 78. An inner edge of the inner baffle 86 engages the center electrode 72, and an outer edge of the outer baffle 89 engages the inner surface of the housing 65. The engagement of the edges of the baffles 86–89 with the rods 77 in multiple places provides additional positional stability to the rods 77, which may be somewhat flexible, and reduces variations in the spacing between the rods 77 of the various ring electrodes 78.

The members 86–89 are referred to as baffles because, in addition to support functions, the members 86–89 are intended to affect the flow of liquids through the treater chamber 73. Liquids flowing through the treater 1 are forced around the baffles 86–89 thereby introducing turbulence in the liquids which promotes mixing of portions which have received various degrees of electrolytic treatment. Such mixing results in more even and complete treatment of the liquid media flowing through the treater 1.

With a conductive liquid in the treater chamber 73 and a DC voltage applied from the rectifier or power supply 9 to the housing 65 and center electrode 72, electrical currents flow between the housing 65 and center electrode 72 in a direction which depends on the polarity of the power supply connections thereto. The ring electrodes 78, in effect, form "foraminous" or porous cylindrical electrodes through which the liquid media can flow and function to distribute and even out the flow of current through the liquid. Since the rods 77 of a given ring electrode 78 are not connected directly to the power supply 9, the voltage applied to the housing 65 and center electrode 72 is applied to the rods 77 by conduction through the liquid media. The polarity and magnitude of voltage on the rods 77 of a given ring electrode 78 depends on its relative proximity to the housing 65 and center electrode 72 and the resistance of the annular layers of fluid between the given ring electrode 78 and the housing 65 and center electrode 72. Since the rods 77 of a ring electrode 78 are mutually interconnected, all such rods 77 have the same polarity and magnitude of voltage.

The rods 77 and their arrangement in the ring electrodes 78 controls the current flow between the housing 65 and the center electrode 72 to a substantially radial direction whereby the sum of the resistances of the layers of liquid between the housing 65 and center electrode 72 is applied across the output voltage of the power supply 9. Without the rods 77 arranged in the ring electrodes 78, the current from the power supply 9 may be confined to a small area where the center electrode 72 is closest to the housing 65, such as in an area in which the center electrode 72 droops toward the housing 65 under the influence of gravity.

The treater 1 of a general configuration as shown in FIG. 3 with the rods 77 of each ring electrode 78 mutually interconnected, but wherein the ring electrodes 78 are not directly connected to the power supply 9, is appropriate for treating liquid media of very high conductivity. The general configuration of such a treater is also useful for treating liquid media of somewhat lower conductivity where it is also desirable to subject the liquid to electric fields of spatially reversing polarity, by the manner of interconnection of the rods 77 in a modified treater apparatus 91 shown in FIG. 4.

The rods 77 of ring electrodes 82 and 84 extend on the left (as viewed) to an end insulation plate 92 and are interconnected with the center electrode 72, as by being welded to a connection plate 93. The leftmost ends of the rods 77 of the ring electrodes 81 and 83 are insulated from the connection plate 93 by an insulation plate 94. Similarly, at the right end of the treater 91, the rightmost ends of the rods 77 of the ring electrodes 81 and 83 extend to the end plate 69 of the housing 65 and are interconnected, as by being welded to a connection plate 95. The rightmost ends of the rods 77 of the ring electrodes 82 and 84 are insulated from the connection plate 95 by an insulation plate 96. A housing terminal 98 is provided on the end plate 68, and a center electrode terminal 99 extends through an insulating bushing 100 to the center electrode 72. By this arrangement, the housing 65 and ring electrodes 83 and 81 are connected to one pole of the power supply 9, and the center electrode 72 and the ring electrodes 82 and 84 are connected to an opposite pole of the power supply 9. The polarities of the electric fields between adjacent ring electrodes 78 reverses from one annular section between a set of ring electrodes 78 and the next radially adjacent section. The baffles 86–89 force liquid media flowing through the treater 91 to move radially between the ring electrodes 81–84 to provide even treatment of the liquid.

The treater 1 of FIGS. 3 and 8 and the treater 91 of FIG. 4 are intended for the electrolytic treatment of liquids having low viscosities. FIGS. 6 and 7 diagrammatically illustrate treaters 110 and 111 respectively which are intended for treating liquids of moderate viscosity and relatively high conductivity, such as some sludges and oils carrying contaminants which render them highly conductive. The treaters 110 and 111 are structurally similar, but components thereof are interconnected differently. The same reference numerals will be used in FIGS. 6 and 7 for comparable components.

Each of the treaters 110 and 111 is formed by an elongated cylindrical outer housing 115, which may be similar to the housing 65 of the treaters 1 and 91, as far as fluidic considerations are concerned. In the treaters 110 and 111, each housing 115 is formed by conductive housing sections 116 which are connected in line by insulative housing section connectors 117. An electrode structure 120 is positioned coaxially within the housing 115. The electrode structure 120 is formed of conductive electrode sections 121 which are connected in line by insulative electrode section connectors 122. The illustrated electrode structure 120 has the appearance of an auger, and each electrode section 121 is formed by a center rod 123 with a conductive vane or flighting 124 wrapped helically thereabout to form, in effect, a closed helical structure. The flighting 124 causes turbulence in a liquid flowing through the treaters 110 or 111 to mix portions of the liquid, to thereby promote more even treatment of the liquid media.

The electrode sections 121 are labeled A, C, and E; and the housing sections 116 are labeled B, D, and F. Additionally, each of the sections 116 and 121 carries a polarity indicator (a plus or a minus symbol) based on the manner of connection of components of the treaters 110 and 111 to a positive DC power supply terminal 127 and a negative DC power supply terminal 128, such as the terminals of the rectifier or power supply 9 of FIG. 1.

The treater 110 of FIG. 6 is intended for the treatment of liquid media which do not benefit, as far as electrocoagulation properties, from travel through electric fields of spatially reversing polarities. As in the treater 1, the treater 110 is intended for treatment of liquid media having high conductivity such that it is desirable to apply the power supply voltage across substantial portions of the liquid media to increase the resistance presented to the power supply 9. This is accomplished in the illustrated treater 110 by connecting the positive power supply terminal 127 to the electrode section A, connecting the corresponding housing section B to the next adjacent electrode section C by a conductor 130, connecting the housing section D to the electrode section E by a conductor 131, and connecting the housing section F to the negative power supply terminal 128. While the illustrated treater 110 shows only three such sets of sections, the pattern would be the same for any number of sets of sections. It can be demonstrated, using conventional DC circuit analysis, that with such a connection pattern, electrode sections A, C, and E will all be positive with respect to housing sections B, D, and F, whereby no polarity reversals of electric fields will be experienced by a liquid travelling through the treater 110.

In contrast to the treater 110, the treater 111 is intended for treating liquid media in which the contaminants are more readily electrocoagulated by passage of the media through electric fields of reversing polarity. In the illustrated treater 111, the positive power supply terminal 127 is connected to electrode section A, corresponding housing section B is connected to adjacent housing section D by a conductor 135; electrode section C is connected to adjacent electrode section E, and housing section F is connected to the negative power supply terminal 128. It should be noted that with an odd number of sets of sections 116 and 121, one power supply terminal will be connected to an end electrode section and the opposite power supply terminal will be connected to an end housing section. However, with an even number of sets of sections 116 and 121, both power supply terminals will be connected to the same type of end sections, either both end electrode sections 121 or both end housing sections 116.

It can be demonstrated, using conventional DC circuit analysis, that with the connection pattern described and shown in FIG. 7 for the treater 111, electrode section A is positive with respect to housing section B, electrode section C is negative with respect to housing section D, and electrode section E is positive with respect to housing section F. Thus, electric fields of spatially reversing polarities are experienced by a liquid passing through the treater 111.

While the term "housing" may appear to be contrasted with the term "electrode" herein, it should be understood that the housings described in connection with the treaters 1, 91, 110, and 111 also function as electrodes. The materials from which the electrode elements of the treaters 1, 91, 110, and 111 are formed are selected according to the types of contaminants and carrier liquids involved in the electrocoagulation processes. In some cases, the electrode materials are chemically involved in the electrocoagulation reactions, whereby the portions of the electrodes are consumed. In other cases, the electrode materials function catalytically. Finally, the electrode materials may not react chemically at all with the contaminants or solvents containing them.

It is to be understood that while certain forms of the present invention have been illustrated and described herein, it is not to be limited to the specific forms or arrangement of parts described and shown.

What is claimed and desired to be secured by Letters Patent is as follows:

1. An electrolytic treater apparatus for liquids and comprising:
   (a) an elongated tubular housing formed of conductive material and closed at opposite ends to form an elongated treater chamber;
   (b) means forming a first fluid connection and a second fluid connection positioned respectively adjacent said opposite ends and defining a flow path through said treater chamber;
   (c) power supply means having a first power supply terminal and a second power supply terminal of opposite polarities and having an output voltage;
   (d) an elongated electrode structure extending through said chamber, said electrode structure having multiple conductive sections insulated from one another;
   (e) said power supply means being connected to said housing and said electrode structure in such a manner that, with a conductive liquid present in said chamber, said output voltage is divided across said electrode structure sections; and
   (f) flow reversing valve means fluidically connected to said first and second fluid connections and being reversibly operable to flow a fluid through said flow path in a first direction from the first connection to the second connection or in the reverse direction from the second connection to the first connection.

2. An apparatus as set forth in claim 1 and including:
   (a) differential pressure sensor means connected to measure a pressure differential between liquid entering said first fluid connection and liquid exiting said second fluid connection; and
   (b) control means connected to said differential pressure sensor means and operative to activate said flow reversing valve means in response to the measured differential pressure exceeding a selected value.

3. An electrolytic treater apparatus for liquids and comprising:
   (a) an elongated tubular housing formed of conductive material and closed at opposite ends to form an elongated treater chamber;
   (b) means forming a first fluid connection and a second fluid connection positioned respectively adjacent said opposite ends and defining a flow path through said treater chamber;

(c) power supply means having a first power supply terminal and a second power supply terminal of opposite polarities and having an output voltage;

(d) an elongated electrode structure extending through said chamber, said electrode structure having multiple conductive sections insulated from one another;

(e) said power supply means being connected to said housing and said electrode structure in such a manner that, with a conductive liquid present in said chamber, said output voltage is divided across said electrode structure sections;

(f) temperature differential sensor means connected to measure a temperature differential between liquid entering said first fluid connection and liquid exiting said second fluid connection; and (g) control means connected to said power supply means, having said temperature sensor means connected thereto, and controlling a current flow between said terminals in response to the measured temperature differential.

4. An electrolytic treater apparatus for liquids and comprising:

(a) an elongated tubular housing formed of conductive material and closed at opposite ends to form an elongated treater chamber;

(b) means forming a first fluid connection and a second fluid connection positioned respectively adjacent said opposite ends and defining a flow path through said treater chamber;

(c) power supply means having a first power supply terminal and a second power supply terminal of opposite polarities and having an output voltage;

(d) an elongated electrode structure extending through said chamber, said electrode structure having multiple conductive sections insulated from one another;

(e) said power supply means being connected to said electrode structure in such a manner as to provide electric fields of spatially reversing polarity to a liquid passing through said chamber; and (f) flow reversing valve means fluidically connected to said first and second fluid connections and being reversibly operable to flow a fluid through said fluid path in a first direction from the first connection to the second connection or in the reverse direction from the second connection to the first connection.

5. An apparatus as set forth in claim 4 and including:

(a) differential pressure sensor means connected to measure a pressure differential between liquid entering said first fluid connection and liquid exiting said second fluid connection; and (b) control means connected to said differential pressure sensor means and operative to activate said flow reversing valve means in response to the measured differential pressure exceeding a selected value.

6. An electrolytic treater apparatus for liquids and comprising:

(a) an elongated tubular housing formed of conductive material and closed at opposite ends to form an elongated treater chamber;

(b) means forming a first fluid connection and a second fluid connection positioned respectively adjacent opposite ends and defining a flow path through said treater chamber;

(c) power supply means having a first power supply terminal and a second power supply terminal of opposite polarities and having an output voltage;

(d) an elongated electrode structure extending through said chamber, said electrode structure having multiple conductive sections insulated from one another;

(e) said power supply means being connected to said electrode structure in such a manner as to provide electric fields of spatially reversing polarity to a liquid passing through said chamber;

(f) temperature differential sensor means connected to measure a temperature differential between liquid entering said first fluid connection and liquid exiting said second fluid connection; and (g) control means connected to said power supply means, having said temperature sensor means connected thereto, and controlling a current flow between said terminals in response to the measured temperature differential.

7. An electrolytic treater apparatus for liquids and comprising:

(a) an elongated tubular housing formed of conductive material and closed at opposite ends to form an elongated cylindrical treater chamber;

(b) means forming a first fluid connection and a second fluid connection positioned respectively adjacent said opposite ends and defining a flow path through said treater chamber;

(c) an elongated center electrode assembly positioned coaxially within said cylindrical chamber, said electrode assembly being formed of conductive material and having a closed helical shape;

(d) power supply means having a pair of terminals of opposite polarity, one of said terminals being connected to said housing and the other of said terminals being connected to said electrode; and (e) flow reversing valve means fluidically connected to said first and second fluid connections and being reversibly operable to flow a fluid through said flow path in a first direction from the first connection to the second connection or in the reverse direction from the second connection to the first connection.

8. An electrolytic treater apparatus for liquids and comprising:

(a) an elongated tubular housing formed of conductive material and closed at opposite ends to form an elongated cylindrical treater chamber;

(b) means forming a first fluid connection and a second fluid connection positioned respectively adjacent said opposite ends and defining a flow path through said treater chamber;

(c) an elongated center electrode assembly positioned coaxially within said cylindrical chamber, said electrode assembly being formed of conductive material and having a closed helical shape;

(d) power supply means having a pair of terminals of opposite polarity, one of said terminals being connected to said housing and the other of said terminals being connected to said electrode;

(e) flow reversing valve means fluidically connected to said first and second fluid connections and being reversibly operable to flow a fluid through said flow path in a first direction from the first connection to the second connection or in the reverse direction from the second connection to the first connection;

(f) differential pressure sensor means connected to measure a pressure differential between liquid entering said first fluid connection and liquid exiting said second fluid connection; and (g) control means connected to said differential pressure sensor means and operative to activate said flow reversing valve means in response to the measured differential pressure exceeding a selected value.

9. An electrolytic treater apparatus for liquids and comprising:

(a) an elongated tubular housing formed of conductive material and closed at opposite ends to form an elongated cylindrical treater chamber;

(b) means forming a first fluid connection and a second fluid connection positioned respectively adjacent said opposite ends and defining a flow path through said treater chamber;

(c) an elongated center electrode assembly positioned coaxially within said cylindrical chamber, said electrode assembly being formed of conductive material and having a closed helical shape;

(d) power supply means having a pair of terminals of opposite polarity, one of said terminals being connected to said housing and the other of said terminals being connected to said electrode assembly;

(e) temperature differential sensor means connected to measure a temperature differential between liquid entering said first fluid connection and liquid exiting said second fluid connection; and (f) control means connected to said power supply means, having said temperature sensor means connected thereto, and controlling a current flow between said terminals in response to the measured temperature differential.

\* \* \* \* \*